(12) United States Patent  
Petersen (10) Patent No.: US 8,368,272 B1  
(45) Date of Patent: Feb. 5, 2013

(54) ASSEMBLY AND METHOD FOR MASS TORQUE GENERATION

(76) Inventor: Steven R. Petersen, Rochester, MN (US)

( * ) Notice: Subject to any disclaimer, the term of this patent is extended or adjusted under 35 U.S.C. 154(b) by 323 days.

(21) Appl. No.: 12/924,883

(22) Filed: Oct. 7, 2010

Related U.S. Application Data (60) Provisional application No. 61/343,249, filed on Apr. 26, 2010.

(51) Int. Cl.
*H02K 7/20* (2006.01)
*H02K 17/44* (2006.01)
*H02P 25/00* (2006.01)
*H03K 3/00* (2006.01)

(52) U.S. Cl. .......... 310/112; 318/400.41; 318/432
(58) Field of Classification Search ............ 310/112; 318/400.41, 432
See application file for complete search history.

(56) References Cited

U.S. PATENT DOCUMENTS

| | | | | |
|---|---|---|---|---|
| 3,317,894 A | * | 5/1967 | Jensen | 340/4.36 |
| 3,375,354 A | * | 3/1968 | McGarrell | 318/606 |
| 3,740,630 A | * | 6/1973 | Jarret et al. | 318/400.42 |
| 4,272,226 A | * | 6/1981 | Osborne | 417/418 |
| 5,023,527 A | * | 6/1991 | Erdman et al. | 318/400.34 |
| 2002/0060545 A1 | * | 5/2002 | Inagaki et al. | 318/629 |
| 2005/0184689 A1 | * | 8/2005 | Maslov et al. | 318/254 |
| 2006/0273686 A1 | * | 12/2006 | Edelson et al. | 310/266 |
| 2009/0072639 A1 | * | 3/2009 | Seneff et al. | 310/43 |

* cited by examiner

*Primary Examiner* — Quyen Leung
*Assistant Examiner* — Alex W Mok
(74) *Attorney, Agent, or Firm* — Eggink & Eggink; Anthony G. Eggink; Katrina M. Eggink (57) ABSTRACT

An assembly and method for generating mass torque having a frame structure supporting at least one torque generating wheel coupled to a rotational load. The torque generating wheel has peripheral circumferential veins of spaced magnetic or non-magnetic keys which are driven by an electro-mechanical control system including a plurality of electromagnetic coils and a timing circuit. The timed activation of the electro-mechanical control system on the magnetic (or non-magnetic) keys accelerate the generating wheel to rotate at a high rotational speed to generate a high level of torque output. The wheel structure is a large diameter structure constructed of a plurality of radial segments, each segment formed of a strong, lightweight and reinforced material.

20 Claims, 10 Drawing Sheets

ASSEMBLY AND METHOD FOR MASS TORQUE GENERATION

This application claims the benefit of U.S. Provisional Application Ser. No. 61/343,249, filed Apr. 26, 2010.

BACKGROUND OF THE INVENTION

The present invention relates generally to an assembly and method for generating rotational force or torque. Particularly, the invention relates to an assembly and method utilizing a wheel assembly rotated at varying speeds to generate a substantial amount of rotational energy. More particularly, this invention relates to a rotational energy generating assembly having means to accelerate and to maintain at high rpm's a large torque generating wheel to yield mass torque usable for multiple applications.

Rotating wheel structures for generating power, such as electrical energy, are known in the art. The torque and electrical output of such prior art structures have, however, been limited. For example, the material compositions and methods of construction of prior art structures have limited their size and ability to rotate at higher rpm's. Further, the ability of such prior art wheel assemblies to be accelerated and to reach high rotational speeds and provide a substantial amount of torque has also been limited.

The assembly and method of the present invention to generate substantial rotational energy at high rotational wheel velocities overcome the difficulties and limitations of the prior art. There exists a need for the efficient generation of mass rotational torque in the power industry among others. There also exists a need for an environmentally compatible method of generating energy which has no emissions and which in effect may function as a large brushless electrical motor. For example, in the generation of electrical power, conversion of solar energy, large ship propulsion, power inversion, providing mechanical energy for air movement and for providing electrical power to remote communities, there exists a long felt but unsolved need for these benefits that are provided by the present invention.

SUMMARY OF THE INVENTION

An assembly and method of generating substantial rotational energy having at least one torque generating wheel which is accelerated and rotated at a high rotational speed. A generator may be coupled to the torque generating wheel, for example, and which may be mounted to a base structure. The torque generating wheel is controlled by an electrical control system having a timing circuit to accelerate and rotate the wheel(s) at a high rotational velocity.

Each rotatable wheel may have a plurality of radial wheel segments which, when assembled, form a circular wheel having a peripheral circumferential header that have veins formed by peripheral magnetic and non-magnetic keys that are acted upon by electromagnetic coils.

The electrical control system operative on the electromagnetic coils may have, for example, an HMI (human machine interface), a PLC (programmable logic controller), a capacitor bank, an electrical power supply, electrical controllers, and a timing circuit for activating the electromagnetic coils for the keys aligned on the veins on the periphery or rim of the torque generating wheel.

The torque generating wheel may preferably be constructed of a plurality of interlocking radial segments of lightweight material such as composite carbon/fiber or carbon nano tube material forming a circular wheel assembly. Each wheel segment may have post tensioned cables and the wheel assembly may have a peripheral circumferential cable to further secure the wheel assembly into a unitary, lightweight structure. Each wheel has a peripheral circumferential rim or header from which magnetic and non-magnetic keys extend forming peripheral veins. Electromagnetic coils are radially positioned adjacent the peripheral veins which may have one or more magnetic key segments interposed with one or more non-magnetic key segments, for example. The electromagnets and electrical controllers are controlled by a firing matrix to accelerate and maintain a high rotational wheel velocity.

The torque generating wheel(s) may be a unitary structure and is preferably a lightweight, large diameter structure, i.e., 50 or more ft. in diameter that may be rotatable up to approximately 3600 rpm's to drive a generator, for example, which may yield several megawatts of electrical energy when multiple torque generating wheels are utilized in the mass torque generation assembly.

The assembly and process of the invention may generate rotational torque energy for a rotational load such as an electrical generator, an inverter, a mechanical means to provide propulsion or combinations thereof to provide rotational power. For example, the rotational load may be used to provide electrical power for a community of homes and businesses, to power a ship, or for any other use requiring a rotational torque energy source. The assembly of the present invention may be viewed and adapted for use as a large brushless electrical motor which generates a substantial amount of rotational energy.

The advantage of the present invention is to provide a torque generating assembly which may either be permanently constructed or assembled on a remote site and which efficiently provides sufficient rotational force, for example, to provide electrical power to operate a small community or sections of a larger community. Another advantage of the invention is to provide a lightweight wheel assembly which may rotate at high rpm's to provide mass rotational torque for multiple applications. Another advantage of the invention is to provide an assembly and method to efficiently provide energy without environmentally damaging emissions.

These and other benefits of this invention will become apparent from the following description by reference to the drawings.

DESCRIPTION OF THE PREFERRED EMBODIMENTS

The assembly and method of the invention for generating rotational energy is described by reference to drawing FIGS. 1-11, wherein FIGS. 1, 2, and 8-11 show the structural components of the assembly and FIGS. 3-7 show the electrical components and an exemplary firing matrix that may be utilized in the present invention.

Figure 1:
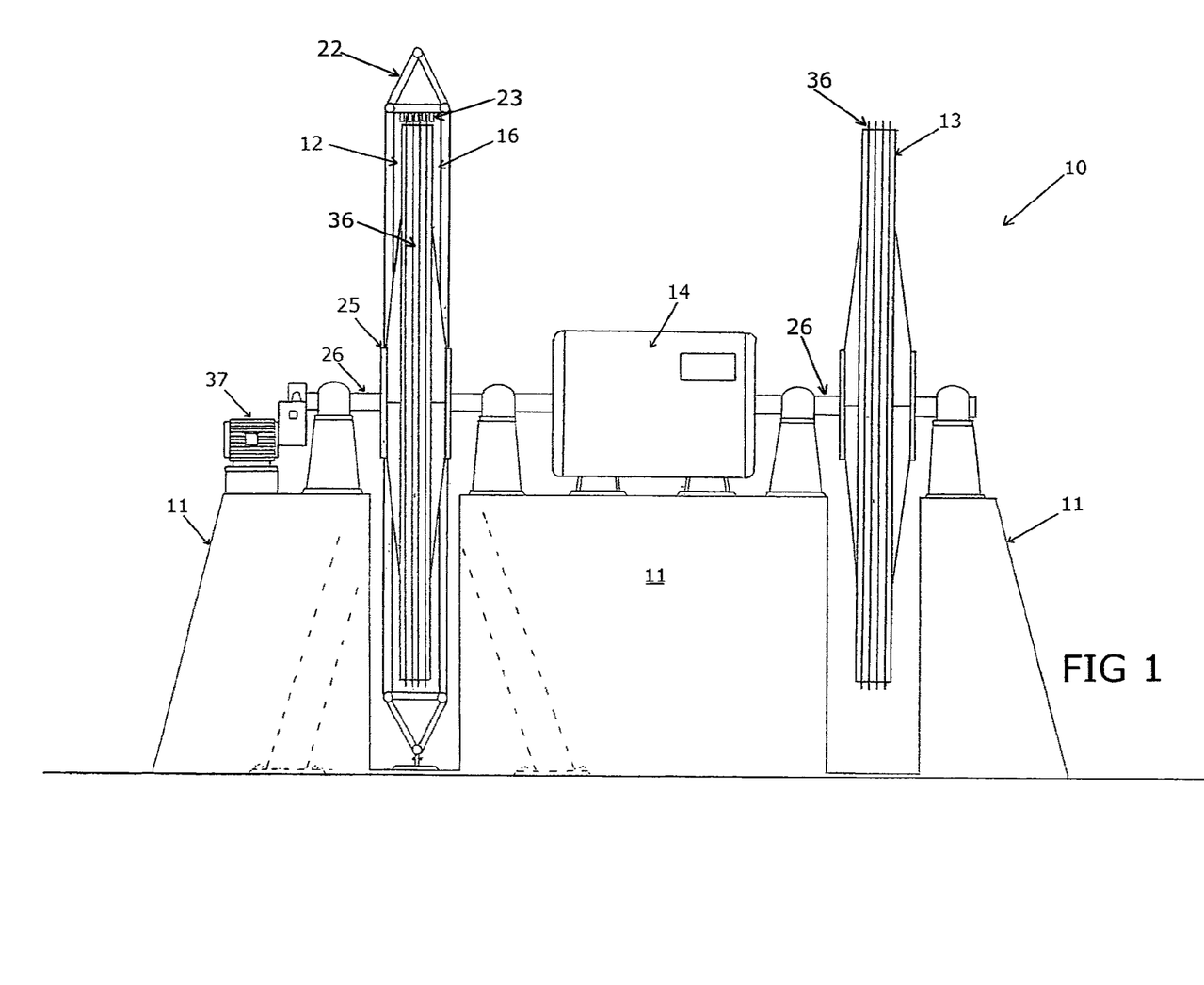
FIG. 1 is an elevational view of the torque producing assembly of the present invention.
Figure 2:
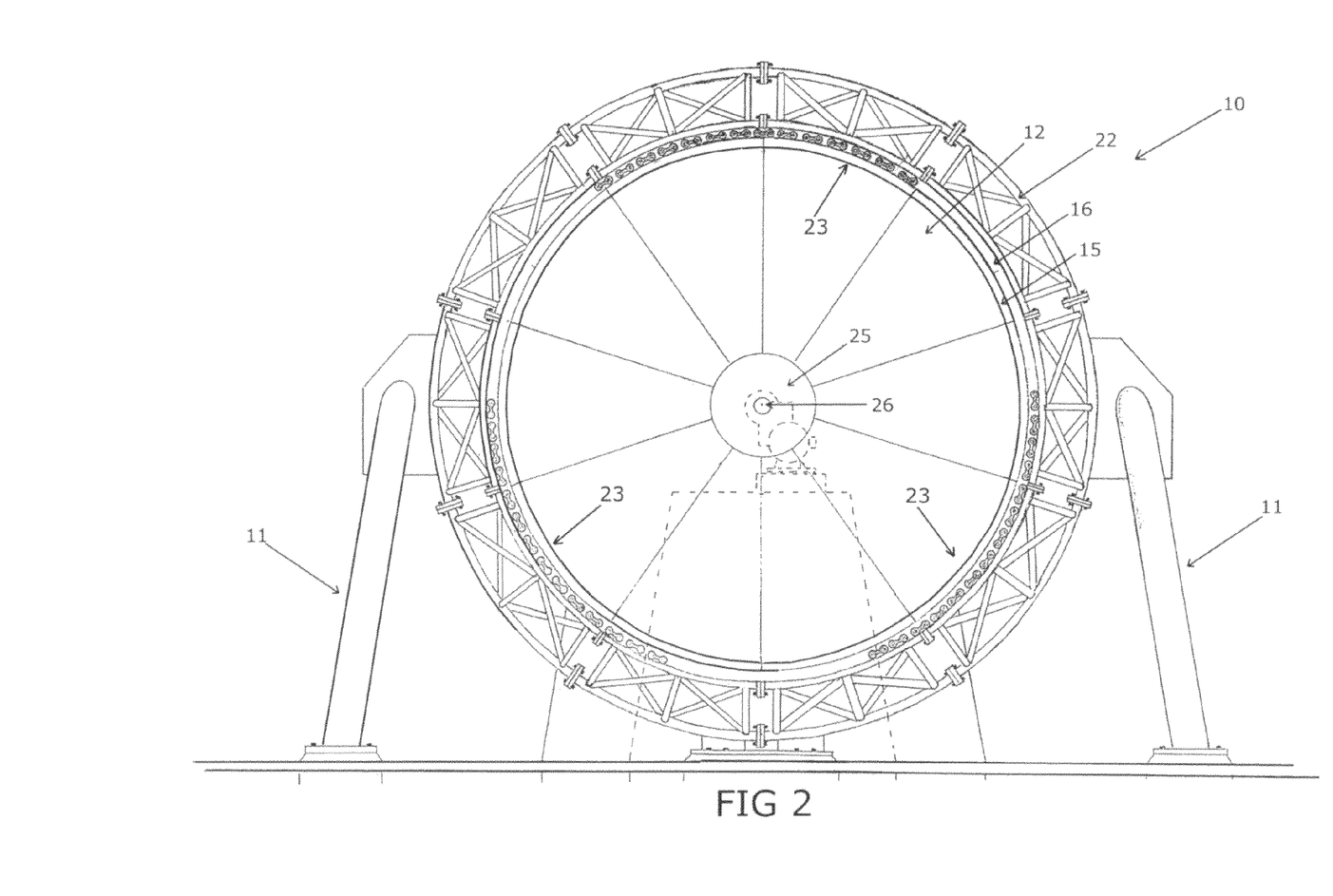
FIG. 2 is a lateral view of the assembly of FIG. 1.

Referring to FIGS. 1 and 2, the mass torque generating assembly 10 is shown mounted on a base 11, such as concrete or steel base structure. Energy generating wheels 12 and 13 are shown mounted on base 11 and axle 26 is shown driving generator 14. The peripheral rim or header of the wheels 12 and 13 are shown to have veins defined by keys 16 which are aligned magnetic and non-magnetic segments which are further shown and described with respect to FIG. 11.

Figure 3:
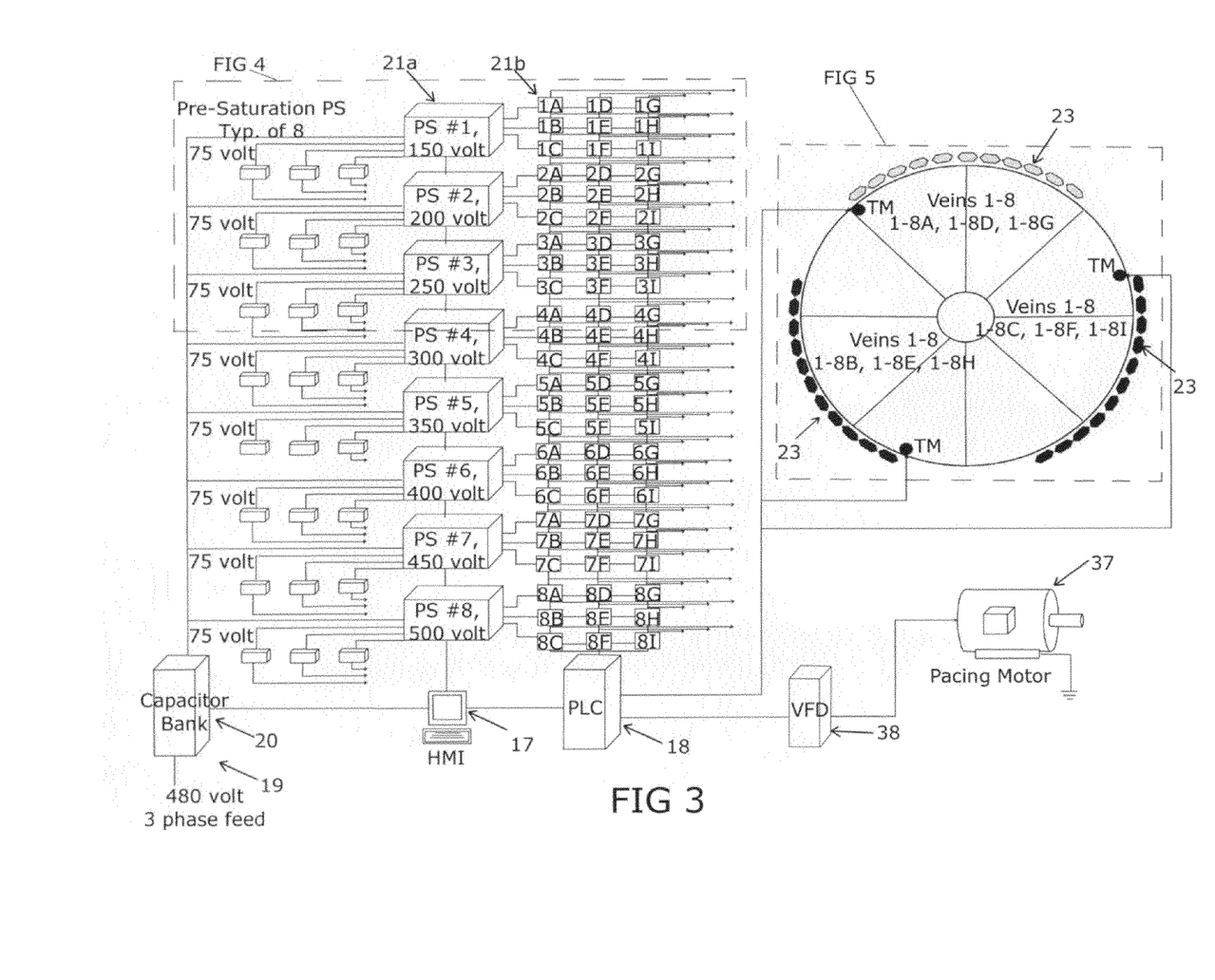
FIG. 3 is a schematic showing the electrical components of the assembly of the invention.
Figure 4:
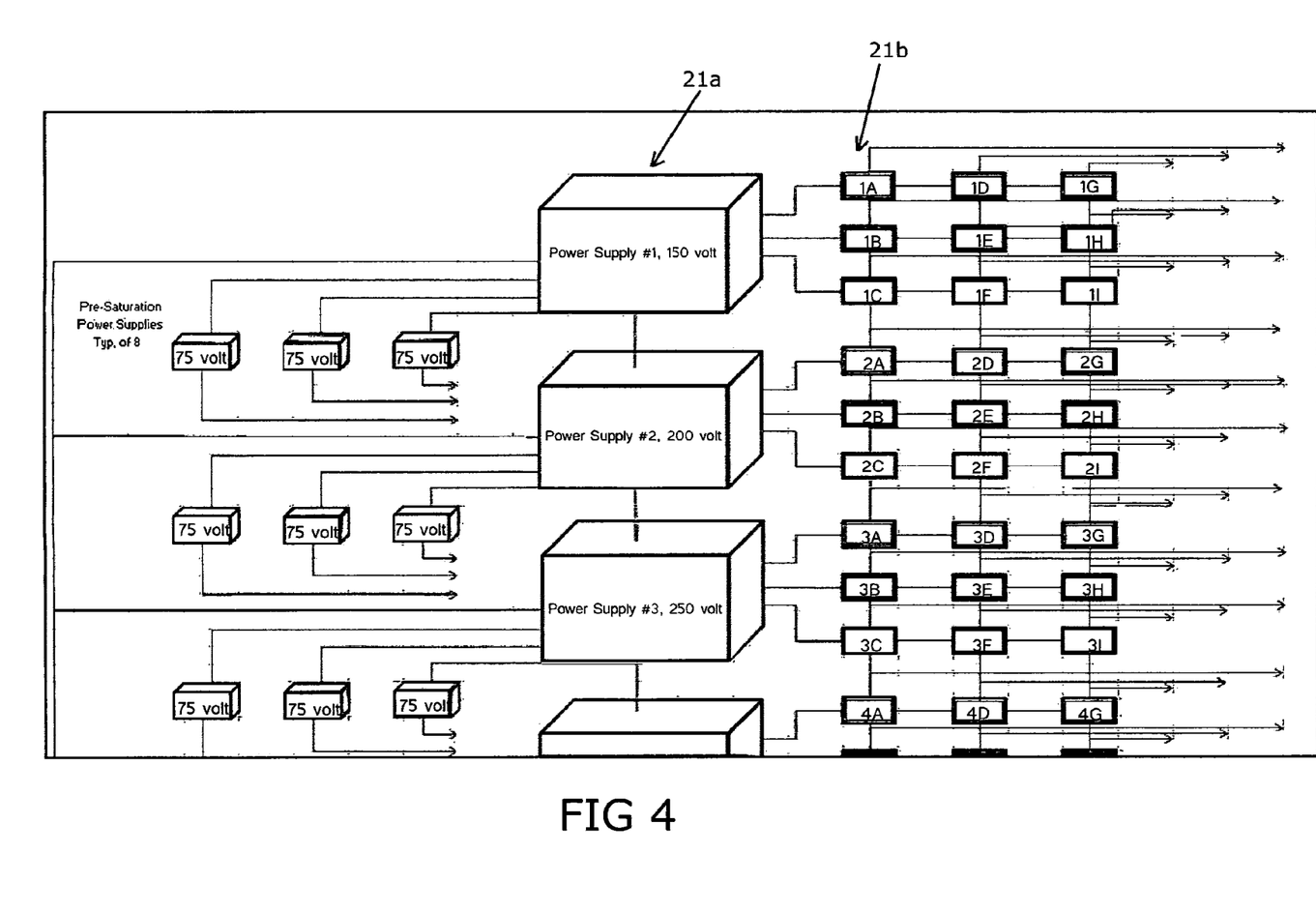
FIG. 4 is an enlarged view showing a portion of the schematic of FIG. 3.

An electrical pacing motor 37 for the wheel 12 controlled by a variable frequency drive 38, as shown in FIGS. 1 and 3, may be directly connected to the axle 26 to assist in the start up of the wheel rotation process, in the sequence timing and for any overload conditions.

Referring further to FIGS. 1 and 2, keys 16 are shown mounted to the rotating wheel 12, 13 in rows or veins 36 and are arranged to interact with the electromagnetic coils 23 mounted on a rigid base 22 such as steel framing, thereby producing the wheel rotation. Veins 36 are defined by the metallic keys and non-metallic keys 16 mounted in a row on the peripheral face or header of the generation wheel 12, as shown particularly in FIGS. 10 and 11. Wheel 12 is shown to have four veins 36 (1-4) and wheel 13 also has four veins 36, which may be referred to as veins 5-8.

Referring to FIG. 3, the electric circuit and the various electrical components of the control system of the invention are shown. Each component and its function are generally as follows: The human machine interface (HMI) 17 is generally a main frame computer which stores and executes a specific process program and which communicates the commands to the programmable logic controller (PLC) 18. The PLC 18 interprets the commands from the HMI 17 and turns the commands into electrical signals that are sent to the field apparatuses to perform specified functions. The PLC 18 also receives status signals from the field and reports them to the HMI program. This activity is commonly known in the industry as processing discrete inputs, outputs and analog controls. The electric pacing motor 37 is shown in communication with variable frequency drive (VFD) 38 and PLC 18.

The assembly 10 has a power source 19 for incoming power that is approximately 480 volts and between approximately 1,500-3,000 amps per power supply 21a. A capacitor bank 20 is utilized to restore the power factor that may be disrupted during the process of controlling the electrical flow to the electromagnetic coils 23. Electrical power supplies 21a, labeled 1-8, are shown utilized to supply both sufficient electrical current and voltage to provide magnetic propulsion and torque for rotating the generation wheels 12, 13 to produce electricity or for any other rotational torque use.

Controllers 21b are installed in specified quantities to allow the PLC 18 time to execute the program. The controllers 21b also control the amount, duration, sequence and physical placement of electricity from the electric power supplies to the electromagnetic coils following a predetermined firing matrix to propel the keys 16 mounted in the veins 36 on the face or header of the generation wheel 12, for example. Electromagnetic coils 23 may be rigidly mounted to frame 22, i.e., a permanent steel structure, and along the circumference of the generation wheel 12, 13, respectively, and are energized utilizing a predetermined matrix (HMI program), thus producing a desired amount of propulsion. Exemplary sequential and increasing or cascading outputs of the coils 23 are shown in FIG. 6.

Referring further to FIG. 3, eight electrical power supplies 21a are shown connected to eight sets of three electrical controllers 21b which provide the electrical power to the three sets of magnetic coils 23. Referring further to the enlarged views of FIGS. 4 and 5, the power supplies 21a shown to power the smaller 75 volt pre-saturation power supplies, are identified as Power supply #1, 150 volt, Power supply #2, 200 volt, Power supply #3, 250 volt, and in 50 volt increments to Power supply #8, 500 volt. The voltage output from power supplies 1-8 can be adjusted by the HMI program via the PLC prospectively or independently to refine or modify the output of the torque generation assembly. The electrical controllers 21b are shown identified with respect to Power supply #1, 150 volt as rows (1A, 1D, 1G), (1B, 1E, 1H) and (1C, 1F, 1I) and as columns (1A, 1B, 1C), (1D, 1E, 1F) and (1G, 1H, 1I). The electrical controller 21b with respect to Power supply #2, 200 volt are similarly identified in rows (2A, 2D, 2G), etc. and in columns (2A, 2B, 2C) etc. With respect to Power supply #3, 250 volt, the electrical controller 21b are identified in rows (3A, 3D, 3G), etc. and in columns (3A, 3B, 3C), etc. With respect to Power supply #4, 300 volt to Power supply #8, the electrical controllers 21b are similarly identified.

Figure 5:
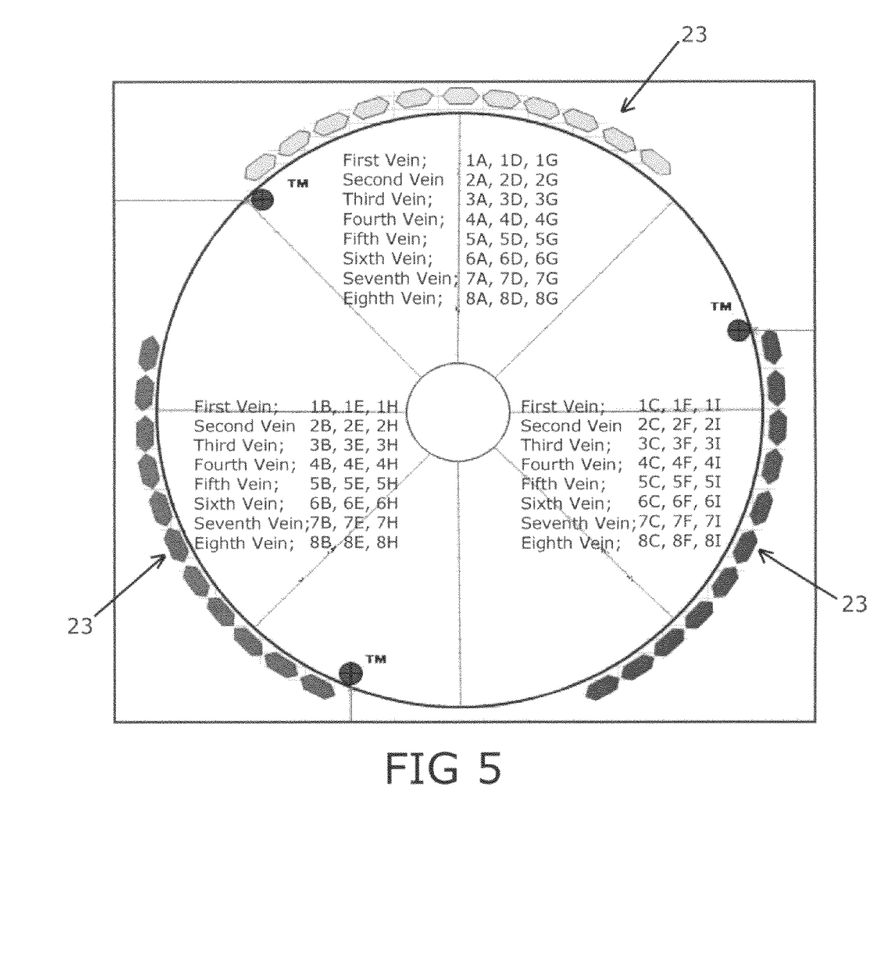
FIG. 5 is an enlarged view showing another portion of the schematic of FIG. 3.

Referring to FIG. 5, three sets of electromagnetic coils 23 are each shown having a column identifying the first vein to the eighth vein, each with three power supply values, i.e., first vein; 1A, 1D, 1G, first vein; 1B, 1E, 1H, first vein; 1C, 1F, 1I, to eighth vein; 8A, 8D, 8G, eighth vein; 8B, 8E, 8H, eighth vein; 8C, 8F, 8I. These power supply values, as shown in FIG. 3, increase from 150 volts, (vein 1) by 50 volt increments to 500 volts (vein 8).

Figure 6:
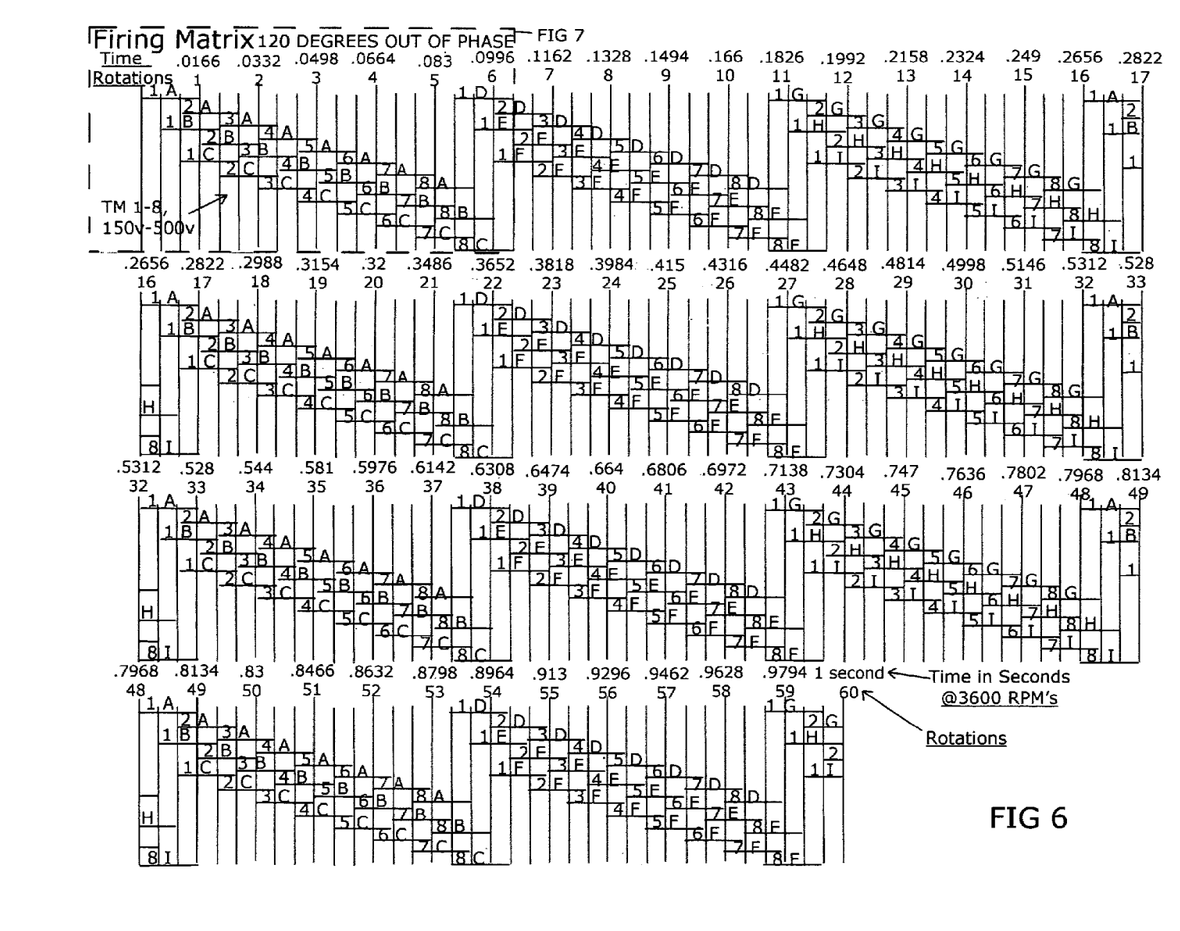
FIG. 6 a schematic showing an embodiment of the firing matrix of the assembly.
Figure 7:
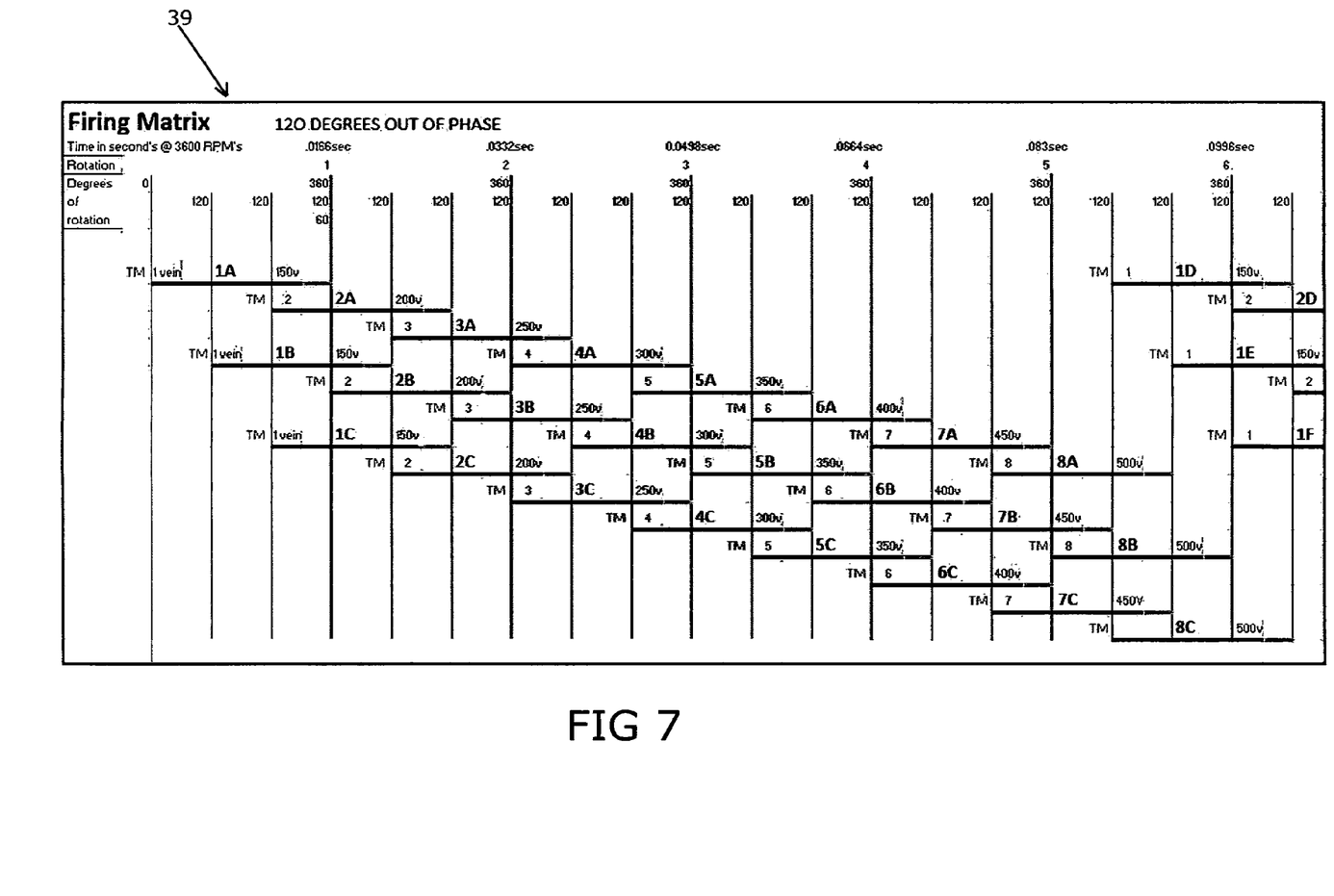
FIG. 7 is an enlarged view showing a portion of the firing matrix of FIG. 6.

Referring to FIGS. 6 and 7, an exemplary cascading sequential firing matrix 39 shows the activation of the power supplies with respect to time and the degree of rotation of the generating wheel. The time (in seconds) is shown at a 3600 RPM wheel rotation and shows the power (voltage) imparted to veins 1-8. In the enlarged view of FIG. 7, for example, the cascading voltage imparted to veins 1-8 is shown from 0 to 0.0996 seconds and which correspond to the values set forth in FIG. 5. In summary, the sequential cascading power imparted to electromagnets 23 provide for the high rotational velocity of the wheel and thus the high rotational torque provided by the invention.

Figure 8:
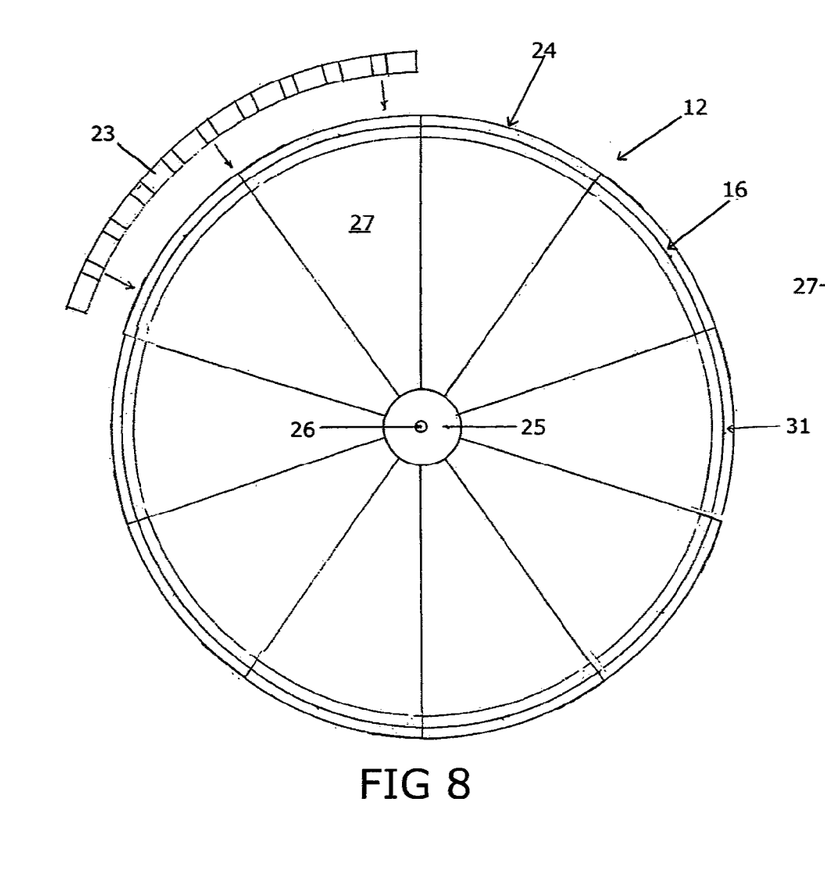
FIG. 8 is a plan view of a torque generating wheel of the assembly.
Figure 9:
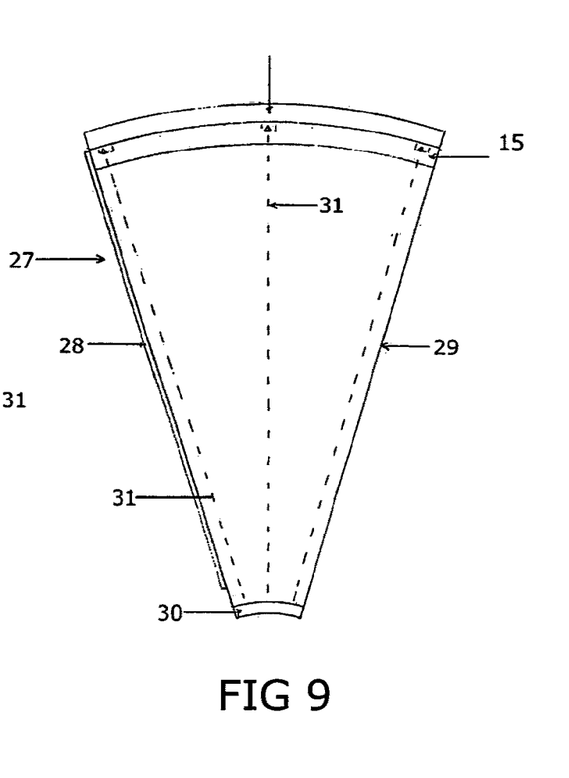
FIG. 9 is a plan view of a torque generating wheel section.

FIGS. 8 and 9 show that the energy generating wheel 12 is constructed of a plurality of radial segments 27, each having a tongue 28 and groove 29, which permit the easy formation of the completed circular wheel of FIG. 8. Each segment 27 is shown to have a tapered end 30 at the bottom and a header 15 at the top. The radial length of the wheel segments directly effects the output torque of the generating wheel 12. Post tension (PT) cables 31 (three) are shown extending within the wheel segment 27, as further shown in FIG. 10. A circumferential cable band 34 is also shown disposed on the periphery of the generation wheel 12 structure. Although wheel segments 27 are shown forming wheel 12, the torque generating wheel may be a solid, unitary structure formed of materials other than the tensioned lightweight materials discussed herein. FIG. 8 shows the formed wheel 12 having an arbor 25, formed of Aluminum, for example, and an aperture for axle 26. At the periphery of wheel 12, a peripheral cable band 34 is shown to hold and maintain the wheel segments 27 in a circular configuration. The keys (magnetic/non-magnetic) 16 and non-metallic key 24 are also shown extending outwardly from the wheel 12 periphery as is an electromagnetic coil 23 spaced therefrom.

Figure 10:
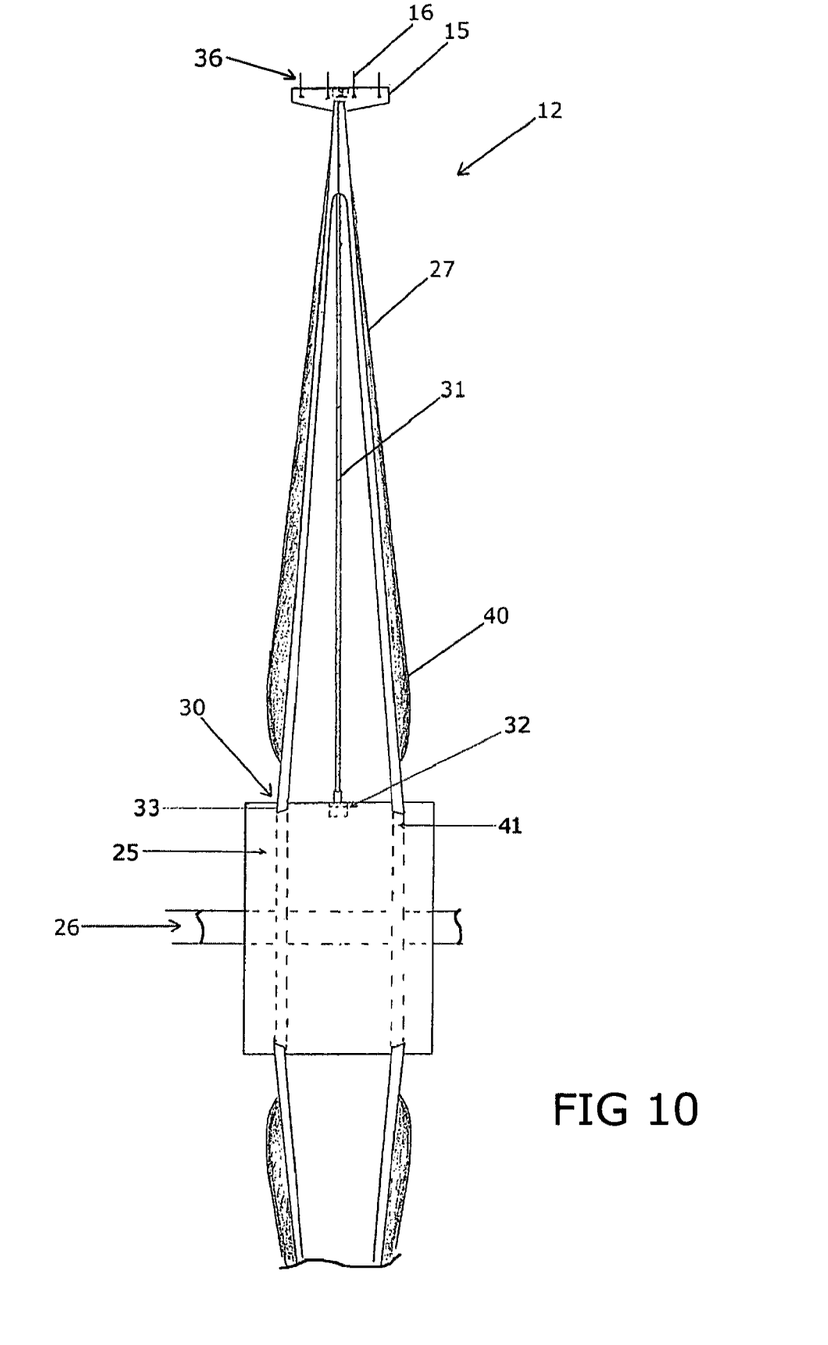
FIG. 10 is a sectional view of the torque generating wheel segment.
Figure 11:
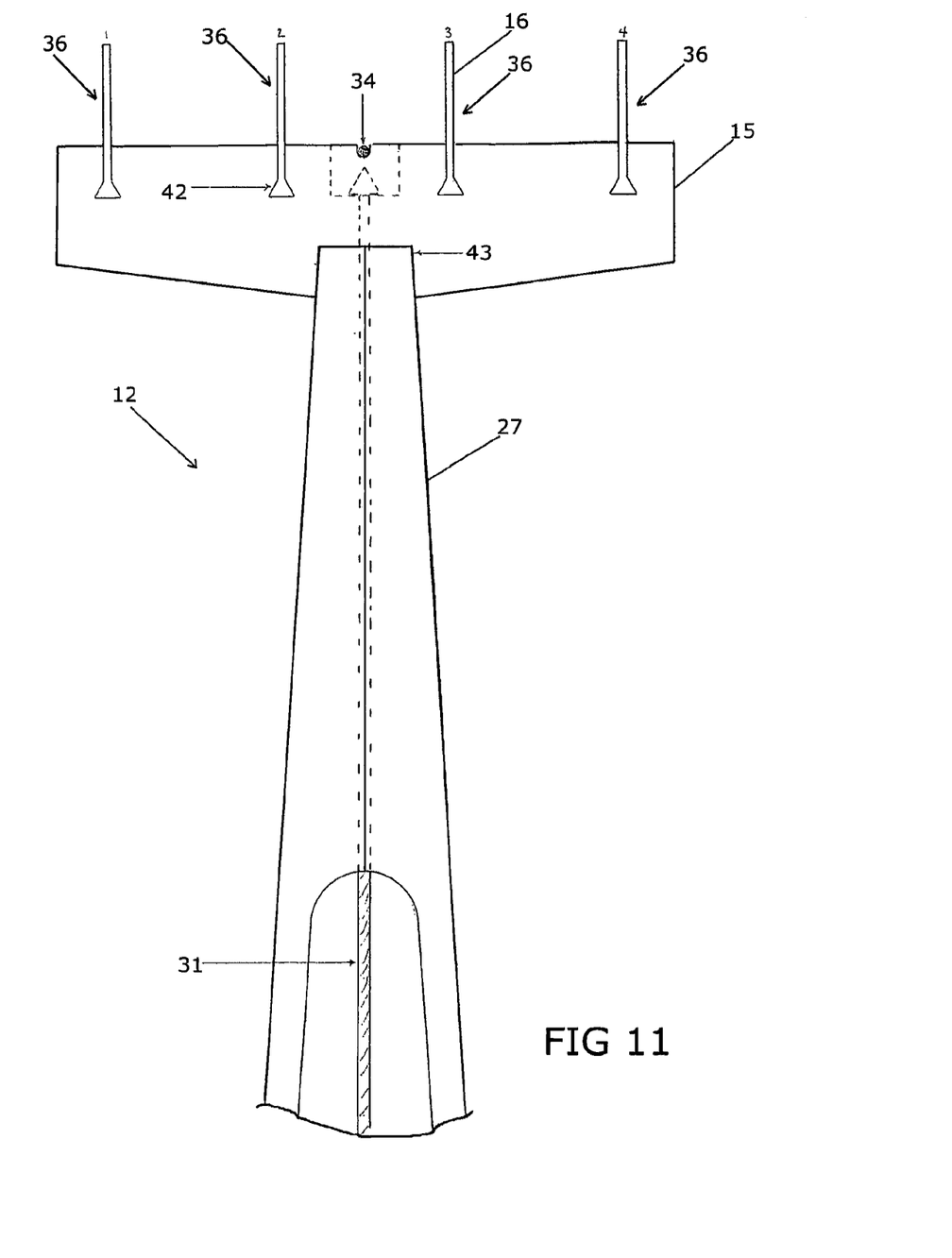
FIG. 11 is an enlarged sectional view showing the veins on the torque generating wheel periphery.

FIG. 10 further shows the keys 16 at the outer periphery of wheel 12 and shows the PT cable 31 held within PT cable anchor pocket 32. The wheel segments 27 as discussed are preferably formed of a lightweight material such as carbon fiber or like composite and lightweight material and the bottom tapered end portions 30 are shown held in tapered grooves 33 and 41 milled into the arbor 25. The wheel segment 27 body is shown to have a tapered bow or spoon-shaped structure 40 to provide added strength and an aerodynamic configuration. FIG. 11 shows circumferential cable 34 at the periphery of wheel 12 and further shows veins 36 having the keys 16 mounted within the milled grooves 42 of the header 15. The sectional view of the wheel segment 27 is further shown held in tapered groove 43 of header 12.

Post tension (PT) cables 31 are important to the generation wheels' integrity and rigidity under high centrifugal forces. The PT cables 31 are implemented to directly cancel out the outward pressure component developed by the centrifugal force of the wheel 12. A circumferential cable band 34 under tension is utilized to further provide for the integrity and rigidity of the generation wheels 12, 13 due to centrifugal forces, as shown in FIG. 11.

The generation wheel 12 utilizes tapered joints to insure rigidity and to tighten the joints under the pressure from the post tension cables 31 and band cables 34. The generation wheel 12 operates at a high rate of speed in order to transfer the electromagnetic force directly to the generator or load 14 using its size to maximize leverage. The placement and spacing of the keys 16 within the veins 36 and the combination or layer of veins mounted in a cascading fashion onto the face of the wheels and which are affixed to a common axis provide effectively an infinite or continuous length of metallic or non-metallic track for the magnetic coils 23 to obtain traction.

In summary, the propulsion of the magnetic/non-magnetic keys aligned in the veins on the generating wheel periphery by the oppositely and adjacently positioned electromagnetic coils at the wheel periphery produce the wheel rotation. The torque produced by the wheel is dependent upon its radius or radial length and the implementation of the cascading magnetic force applied to the magnetic/non-magnetic keys by the electromagnetic coils.

It has also been found that the use of electromagnetic coils may also cause the propulsion of non-magnetic or non-ferrous key structures. Regarding the key(s) of the veins, at least one key or key segment may be utilized in the veins of the invention, although three key segments interposed by non-magnetic keys per vein are shown in the drawings and discussed herein. The keys of the respective veins are shown staggered with respect to each other on the wheel periphery to effectively accelerate the keys by means of the electromagnetic coil energy, the latter being most effective at the tail end of the non-magnetic or non-ferrous key structure length.

As discussed, above, although it is preferred that the generating wheel of the invention be lightweight and segmented, it is within the purview of the invention to utilize a solid wheel structure which may be constructed of other material compositions than those set forth in the present specification.

As many changes are possible to the assembly and method for mass torque generation embodiments of this invention, utilizing the teachings thereof, the description above and the accompanying drawings should be interpreted in the illustrative and not in the limited sense.

That which is claimed is:

1. A torque generation assembly comprising:
    a) a frame structure;
    b) a rotational load;
    c) at least one generating wheel coupled to said rotational load, said generating wheel having a circumferential periphery with at least one peripheral vein, said peripheral vein having at least one magnetic or nonmagnetic key section;
    d) an electromagnetic source positioned adjacent said circumferential periphery of said generating wheel, said electromagnetic source being constructed to act upon said magnetic or nonmagnetic key section of said at least one vein; and
    e) an electrical control system operative on said electromagnetic source, said electrical control system having a timing circuit providing predetermined electromagnetic power to said at least one magnetic key section of said at least one vein.

2. The torque generation assembly of claim 1, wherein said electrical control system provides timed and increased electromagnetic energy to accelerate said at least one magnetic or nonmagentic key section.

3. The torque generation assembly of claim 2, wherein said timing circuit includes a PLC, an HMI, and a cascading sequential firing matrix.

4. The torque generation assembly of claim 1, wherein said rotational load is selected from the group of rotational loads consisting of an inverter, a mechanical gearing assembly, a turbine, a generator and a means of propulsion.

5. The torque generation assembly of claim 1, wherein said at least one torque generating wheel is constructed from a material selected from the group of materials consisting of a lightweight composite material, a carbon/fiber material, a carbon material and nano tube material.

6. The torque generation assembly of claim 1, wherein said torque generating wheel is constructed of a plurality of segments of a circle, wherein each said segment has at least one tensioned cable and wherein said torque generating wheel has at least one peripheral circumferential cable to further secure said segments in a circular configuration.

7. The torque generation assembly of claim 6, wherein each said segment has a cross sectional configuration which is of a tapered bow shape to provide strength and to provide an aerodynamic wheel configuration.

8. The torque generation assembly of claim 1, wherein said at least one peripheral vein has at least one magnetic key portion and at least one interposed non-magnetic key portion.

9. The torque generation assembly of claim 1, wherein said at least one torque generating wheel has a diameter of at least 50 feet and may rotate up to 3600 rpm's to generate a plurality megawatts of electrical energy.

10. The torque generation assembly of claim 1, further comprising an electric pacing motor and a variable frequency drive.

11. A process for generating rotational torque comprising:
    a) providing a torque generation assembly according to claim 1;
    b) activating said electrical control system to provide electromagnetic force on said magnetic or nonmagnetic section of said at least one vein; and
    c) utilizing said timing circuit to provide a sequential and cascading electromagnetic energy force to accelerate said magnetic or nonmagnetic section of said at least one vein to rotate said rotational load.

12. The process for generating rotational torque of claim 11, wherein said rotational load is selected from the group of rotational loads consisting of an inverter, a mechanical gearing assembly, an electrical generator and a means of propulsion.

13. The process for generating rotational torque of claim 11, wherein said torque generating wheel provided is constructed of a plurality of segments of a circle and wherein each said segment has a cross sectional configuration which is of a tapered bow shape to provide strength and to provide an aerodynamic wheel configuration.

14. An assembly for generating mass rotational torque comprising:
   a) a base structure;
   b) a rotational load supported by said base structure and being constructed and arranged to generate rotational torque energy;
   c) at least one torque generating wheel coupled to said load, said torque generating wheel having a peripheral rim having at least one peripheral vein with at least one magnetic or one non-magnetic key;
   d) an electrical control system operative on said at least one torque generating wheel, said control system having a PLC, a capacitor bank, an electrical power supply, at least one electrical controller, and a timing circuit for activating said at least one electrical controller with respect to said peripheral rim of said torque generation wheel; and
   e) whereby the timed activation of said electrical controller with respect to said at least one magnetic or nonmagnetic key of said energy generating wheel causes said wheel to accelerate and rotate at a high rotational speed.

15. The assembly of claim 14, wherein said at least one torque generating wheel is constructed from a material selected from the group of materials consisting of a lightweight composite material, a carbon/fiber material, a carbon material and nano tube material.

16. The assembly of claim 15, wherein said torque generating wheel is constructed of a plurality of segments of a circle and wherein each said segment has at least one tensioned cable and wherein said torque generating wheel has at least one peripheral circumferential cable to further secure said segments in a circular configuration.

17. The assembly of claim 16, wherein each said segment has a cross sectional configuration which is of a tapered bow shape to provide strength and to provide an aerodynamic wheel configuration.

18. The assembly of claim 14, wherein said at least one peripheral vein has at least one magnetic key portion and at least one interposed non-magnetic key portion.

19. The assembly of claim 14, wherein said at least one torque generating wheel has a diameter of at least 50 feet and may rotate up to 3600 rpm's to generate a plurality of megawatts of electrical energy.

20. The assembly of claim 14, wherein said timing circuit provides a sequential cascading electromagnetic force to said at least one magnetic or nonmagnetic key of said at least one peripheral vein.

* * * * *